United States Patent
Luo

(10) Patent No.: US 10,848,610 B1
(45) Date of Patent: Nov. 24, 2020

(54) APPARATUS TO ALARM DRIVERS WHEN AN INFANT IS LEFT IN A VEHICLES UNATTENDED

(71) Applicant: William Douglas Luo, Danville, CA (US)

(72) Inventor: William Douglas Luo, Danville, CA (US)

(*) Notice: Subject to any disclaimer, the term of this patent is extended or adjusted under 35 U.S.C. 154(b) by 0 days.

(21) Appl. No.: 16/445,094

(22) Filed: Jun. 18, 2019

(51) Int. Cl.
```
G08B 1/08       (2006.01)
H04M 1/725      (2006.01)
B60N 2/00       (2006.01)
B60R 22/48      (2006.01)
H04W 4/48       (2018.01)
H04W 4/20       (2018.01)
B60N 2/28       (2006.01)
```

(52) U.S. Cl.
CPC ........ *H04M 1/72538* (2013.01); *B60N 2/002* (2013.01); *B60R 22/48* (2013.01); *H04M 1/72547* (2013.01); *H04W 4/20* (2013.01); *H04W 4/48* (2018.02); *B60N 2/28* (2013.01); *B60R 2022/4816* (2013.01); *B60R 2022/4866* (2013.01); *H04M 2242/04* (2013.01)

(58) Field of Classification Search
CPC ..... B60N 2/002; B60N 2/26; H04M 1/72538; G07C 5/008; G08B 21/22; G08B 21/0205; G08B 21/0202
See application file for complete search history.

(56) References Cited

U.S. PATENT DOCUMENTS

| | | | |
|---|---|---|---|
| 9,424,728 B2 * | 8/2016 | Rambadt ............... | B60N 2/002 |
| 10,131,318 B2 * | 11/2018 | Davis ..................... | G08B 25/08 |
| 2012/0232749 A1 * | 9/2012 | Schoenberg .......... | B60N 2/002 |
| | | | 701/36 |
| 2016/0200250 A1 * | 7/2016 | Westmoreland ........ | B60Q 9/00 |
| | | | 340/457.1 |
| 2018/0025604 A1 * | 1/2018 | Protopsaltis ........ | G08B 21/0205 |
| | | | 340/457 |
| 2018/0354443 A1 * | 12/2018 | Ebrahimi .............. | B60R 22/105 |
| 2020/0058210 A1 * | 2/2020 | Williams ................ | H04W 4/06 |

* cited by examiner

*Primary Examiner* — Toan N Pham

(57) ABSTRACT

A child car seat safety system that relies on short distance wireless connections between a driver's cell phone, a vehicle and a wireless enabled car seat. A mobile app running on the driver's cell phone closely monitors state transitions of the system, evaluates different combination of connection status, filters out normal situations, precisely identify dangerous scenario and alarm the driver. This three-party system avoids many false alarms and other short-comings of other designs, and can provide reliable services to safe lives.

5 Claims, 3 Drawing Sheets

APPARATUS TO ALARM DRIVERS WHEN AN INFANT IS LEFT IN A VEHICLES UNATTENDED

FIELD OF INVENTION

The technology relates to the general field of children car seat safety. Specifically, it addresses the problem that people inadvertently leave infants in car seats unattended, resulting injury or deaths during severe weather.

BACKGROUND

Every year, hundreds of young children die in the US because adults accidently leave them behind in vehicles during hot weather. Since most of the time infant seats are installed at the rear of the vehicle, they can be easily forgotten when drivers leave the vehicles. During summer, temperature inside can easily reach more than 100 degree. Infants cannot survive such condition for more than half an hour. This invention is intended to alert the driver when an infant is left inside a vehicle unattended to reduce the chance of such tragedy.

SUMMARY

This invention uses presence information of short distance wireless connections between a vehicle, a wireless-enabled car seat and the driver's cell phone to determine whether it is in a dangerous situation (infant left alone in the car), or just normal situations (e.g., both are inside the vehicle, or the driver is with the infant and the seat but not in a vehicle, etc.) It leverages system state transition info to achieve high accuracy.

A system in accordance with this invention includes three components: (1) Car seat with a built-in or externally attached short-distance wireless device, e.g., a Bluetooth transceiver, which can communicate with the cell phone when the seat is in use; (2) A vehicle with capability of short-distance wireless communication; and (3) A smart phone or device with short-distance wireless connection capability.

When a child is placed in the car seat and seat belt is connected, the seat's wireless device is activated and communication connection with the phone is automatically established. When the car is subsequently started, the car's wireless connection to the phone will also be established. At this moment, a wireless application running on the phone becomes alarmed and start monitoring the status of the 2 connection. When the driver unbuckles the children's seat belt at the end of the trip, its wireless device sends a Buckle-off message to the phone app, which will dis-alarm the app. In the case the child is forgotten and left inside the car, both connections will disappear (when the driver is more than 10 yards away from the car and the seat) and there is no Buck-off message received beforehand. An alert sound/vibration will play on the phone to remind the driver.

This method/system can reliably detect different scenario and decide whether it is in a real dangerous situation or not. It can avoid false alarms which happen in many other designs.

BRIEF DESCRIPTION OF THE DRAWINGS

Embodiments of the invention are disclosed in the following detailed description and accompanying drawings.

DETAILED DESCRIPTION AND PREFERRED EMBODIMENT

The following is a detailed description of exemplary embodiment to illustrate the principles of the invention. The embodiments are provided to illustrate aspects of the invention, but the invention is not limited to any embodiment. The scope of the invention encompasses numerous alternatives, modifications and equivalent; it is limited only by the claims.

Numerous specific details are set forth in the following description in order to provide a thorough understanding of the invention. However, the invention may be practiced according to the claims without some or all of these specific details. For the purpose of clarity, technical material that is known in the technical fields related to the invention has not been described in detail so that the invention is not unnecessarily obscured.

Figure 1:
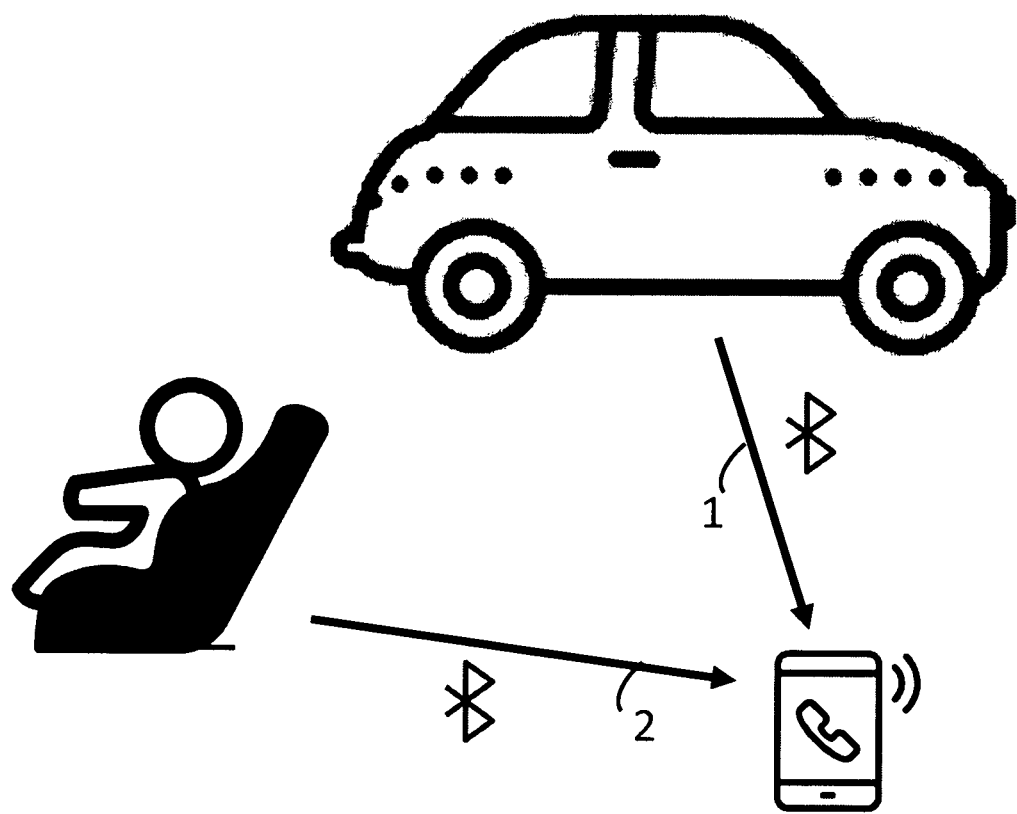
FIG. 1 illustrates wireless connections between the phone, the car seat and the car.
Figure 2:
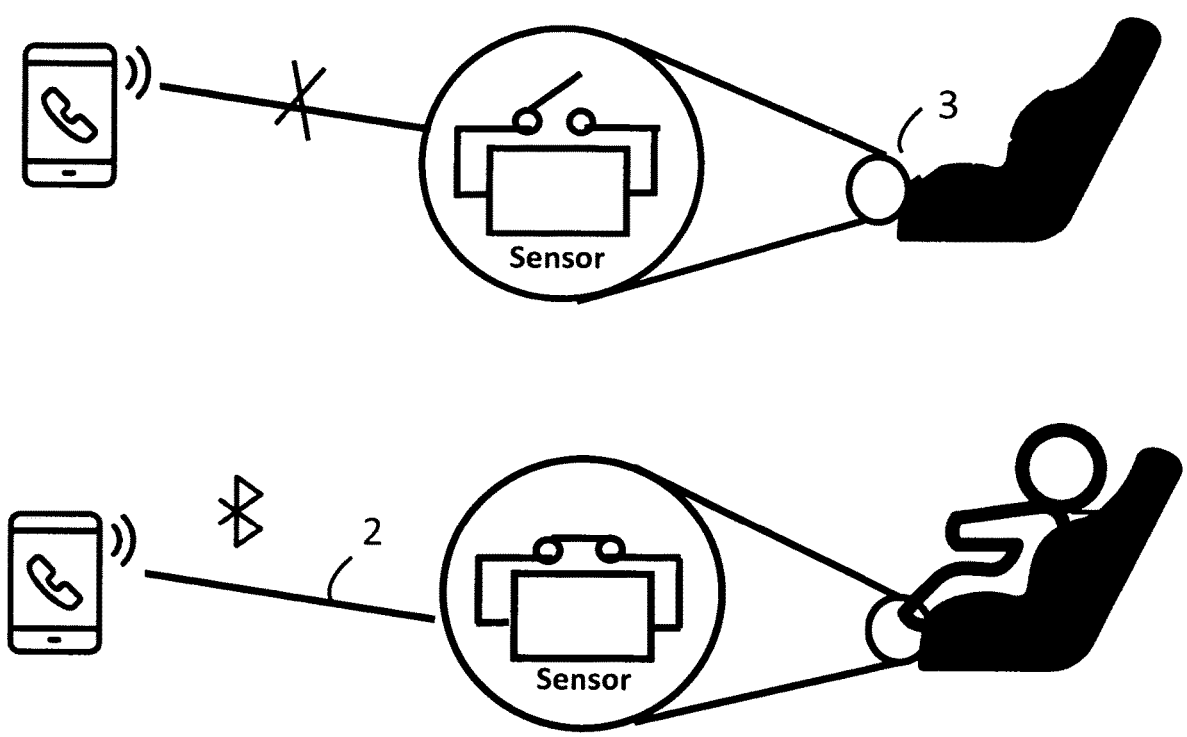
FIG. 2 illustrates two different status of the car seat wireless device: when no child is on the seat and when a child is on the seat. Only when a child is on the seat, a buckle sensor will trigger the device which then connects to the phone.

Referring more particular to the drawings, FIG. 2 shows a car seat with a sensor (3) attached to the its seatbelt buckle. When the seatbelt is connected, the sensor activates, in an embodiment, a blue tooth wireless connection device, which will than establish a connection (2) with the phone. When the vehicle is started, its Bluetooth function also establishes a connection (1) to the phone as shown on FIG. 1. With both connections detected, the app running on the phone is 100% sure that a child is placed in the car and starts monitoring state changes.

Figure 3:
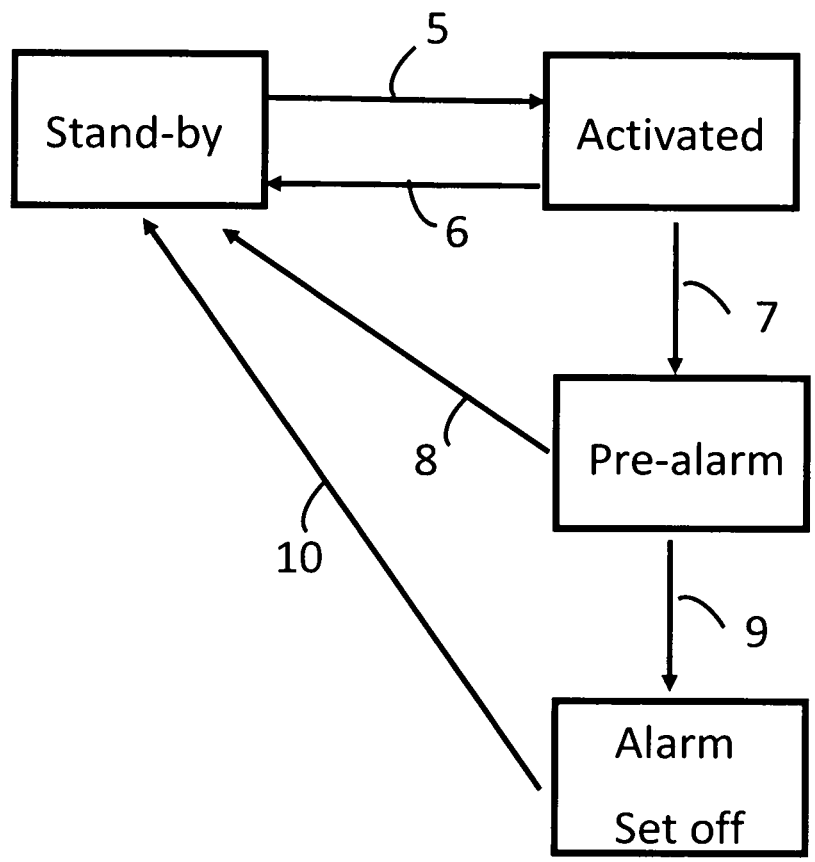
FIG. 3 illustrates system state transition flow on how the phone app handles different scenario based on the connections status. It shows how an embodiment can precisely determine whether a child is indeed at risk, or just some scenario of no risk.

FIG. 3 shows how the mobile app reacts to different situation. Given most infant car seats can be used as a carry-on basket outside of a vehicle or within a vehicle as a safety device, carefully evaluating the wireless connections status of both the car seat and the vehicle allows the app to precisely determine whether it is in a real risky situation or not.

For the app, when only the seat connection is detected, the system does not need to be alarmed since it can be a scenario that the infant seat is being carried on by the adult outside of a vehicle. Similarly if only the vehicle connection is detected, it means no child is being placed in the car seat or a car seat is not inside the vehicle at all, in which case the system does not need to be alarmed. Only if both connections are detected, it will be alarmed (referring to 5 in FIG. 3). After getting into alarmed state, the system will closely monitor the two connections. If at any time the child is unbuckled and removed from the car seat, the seat's device will send an explicit Buckle-off message to the phone before it powers off or deactivate itself (6). The message will dis-alarm the phone's app and the app will get into power-saving standby mode. If no Buckle-off message is ever received since getting into the alarmed state, the app will set off alarm when it loses connections with both the car and the car seat because it indicates a real risk scenario that the child is still in the car seat and the driver is away from the car. If only the connection with the car is lost, it just means engine is turned off but the driver is still with the child, in which case the system will move to a pre-alarm state (7) but no need to set off alarm. Similarly if only the connection with the seat gets lost, it means either the whole car seat together with the child is taken away from the vehicle by a second adult, or the drive is outside of the car but still within approximation of the vehicle, in which case no need to set off alarm and the system just needs to move to the pre-alarm state (7). The app will only set off alarm when it loses a second connection (9) after it gets into the pre-alarm state (meaning both connections get lost) because it indicates a real risk scenario that the child remains in the seat and the driver is away from the car. At any time, the system will dis-alarm itself and goes into power saving mode whenever it receives the Buckle-off message from the car seat (6 and 8).

Definitions

A. Short distance wireless connection—is broadly defined to include any kind of wireless communications between two or more devices with max range of around 10 yards. Bluetooth communication is one typical example.

B. Car seats—are defines as child safety seats used with vehicles, including seats for infant and young children.

FIG. 1—Wireless Communication Connections

FIG. 1 illustrates how a mobile application running in a cell phone connects to and the car and car seat through short-distance wireless connections. It is similar to what people commonly see when their cell phones connect to the car and use the car's build-in speakers and microphone during phone calls. When the feature is enabled and whenever the phone is close to the car and the car is turned on, they know each other' existence and communication link is established automatically. The connection between the phone and a wireless-enabled car seat is similar. Given the nature of short distance communication, when the driver walks away from the car or car seat and the distance reaches the maximum coverage the communication (typically 10 yards), the connections will be broken or get lost, and the mobile app will detect that. We leverage this to determine the relative distances between the driver and the car and the car seat.

FIG. 2—Wireless-Enabled Car Seat

FIG. 2 illustrates a car seat with wireless communication capability. In a preferred embodiment, the seat belt buckle of the car seat has a sensor or switch, which can activate/deactivate its wireless device when the buckle is inserted/released, respectively. Only when it is activated, it will be able to connect to the mobile app. If the buckle is inserted and then released, the device will send a Buckle-Off message to the mobile app through the wireless connection before it de-activate itself. In such a case, the app knows the child is removed from the seat and it does not need to be in the alarmed mode.

FIG. 3—Mobile Application State Transition Diagram

FIG. 3 illustrates how the app is activated, gets into different status based on the situations, and sets off alarms (sounds/vibration) when it detects a child is left in the car seat and the driver is away. It detects the situations by monitoring the communication connections.

CONCLUSION

The disclosed embodiments are illustrative, not restrictive. While specific configurations of the safety system has been described, it is understood that the present invention can be applied to a wide variety of car seat safety systems. There are many alternative ways of implementing the invention.

What is claimed is:

1. An apparatus of detecting a child being accidently left in a vehicle unattended comprising:
   a car seat with Bluetooth wireless connectivity capability and a seat belt sensor; a vehicle with Bluetooth wireless connectivity capability; a cell phone comprising a mobile app running on the cell phone, wherein the mobile app is configured to:
   connect to the vehicle and the car seat through Bluetooth wireless connections;
   monitor the status of the two wireless connections;
   listen to a seat belt unbuckling signal coming from the car seat;
   determine the child is accidentally left in the vehicle unattended if both connections
   are lost without receiving the unbuckling signal; play alerts on the cell phone.

2. The apparatus of claim 1, wherein the seat belt sensor comprises a mechanical switch installed inside a seat belt buckle on the car seat detecting whether a seat belt is buckled or unbuckled, wherein a car seat's wireless communication module is activated and ready for connection whenever the seat belt is buckled, wherein the unbuckling signal is sent and subsequently the communication module is deactivated whenever the seat belt is unbuckled.

3. The apparatus of claim 1, wherein the mobile app will be activated whenever both connections are detected.

4. The apparatus of claim 1, wherein the mobile app will be deactivated whenever the seat belt unbuckling signal is received.

5. The apparatus of claim 1, wherein alerts comprise playing sounds and displaying visuals on the cell phone.

* * * * *